United States Patent
Kim et al.

(10) Patent No.: US 9,558,233 B1
(45) Date of Patent: Jan. 31, 2017

(54) DETERMINING A QUALITY MEASURE FOR A RESOURCE

(71) Applicant: Google Inc., Mountain View, CA (US)

(72) Inventors: Hyung-Jin Kim, Sunnyvale, CA (US); Paul Haahr, San Francisco, CA (US); Kien Ng, Wanchai (HK); Chung Tin Kwok, Mountain View, CA (US); Moustafa A. Hammad, San Jose, CA (US); Sushrut Karanjkar, Fremont, CA (US)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 13/731,354

(22) Filed: Dec. 31, 2012

Related U.S. Application Data

(60) Provisional application No. 61/731,936, filed on Nov. 30, 2012.

(51) Int. Cl.
*G06F 17/30* (2006.01)

(52) U.S. Cl.
CPC ......... *G06F 17/30386* (2013.01); *G06F 17/30* (2013.01)

(58) Field of Classification Search
CPC ............ G06F 17/30864; G06F 17/3053; G06F 17/30861
USPC .................. 707/E17.108, 999.003, 723, 748, 706,707/722, 749, 709, 713, 705, 726, 707, 751,707/710, E17.199; 706/14
See application file for complete search history.

(56) References Cited

U.S. PATENT DOCUMENTS

| | | | |
|---|---|---|---|
| 6,112,203 A * | 8/2000 | Bharat et al. | |
| 6,256,648 B1 * | 7/2001 | Hill | G06F 17/30994 707/E17.111 |
| 6,799,176 B1 | 9/2004 | Page | |
| 7,269,643 B2 | 9/2007 | Spaid | |
| 7,475,067 B2 | 1/2009 | Clary et al. | |
| 8,078,614 B2 | 12/2011 | Clary et al. | |
| 8,161,042 B2 | 4/2012 | Clary et al. | |
| 8,316,029 B2 | 11/2012 | Lawrence | |
| 2003/0120654 A1 * | 6/2003 | Edlund et al. | 707/7 |
| 2004/0030688 A1 * | 2/2004 | Aridor et al. | 707/3 |

(Continued)

OTHER PUBLICATIONS

Office Action issued in U.S. Appl. No. 13/731,403 on Sep. 16, 2014, 17 pages.

(Continued)

*Primary Examiner* — Robert Beausoliel, Jr.
*Assistant Examiner* — Pedro J Santos
(74) *Attorney, Agent, or Firm* — Fish & Richardson P.C.

(57) ABSTRACT

Methods, systems, and apparatus, including computer programs encoded on a computer storage medium, for determining a measure of quality for a resource. In one aspect, a method includes determining a seed score for each seed resource in a set. The seed score for a seed resource can be based on a number of resources that include a link to the seed resource and a number of selections of the links A set of source resources is identified. A source score is determined for each source resource. The source score for a source resource is based on the seed score for each seed resource linked to by the source resource. Source-referenced resources are identified. A resource score is determined for each source-referenced resource. The resource score for a source-referenced resource can be based on the source score for each source resource that includes a link to the source-referenced resource.

24 Claims, 10 Drawing Sheets

(56) References Cited

U.S. PATENT DOCUMENTS

| | | |
|---|---|---|
| 2005/0165781 A1 | 7/2005 | Kraft et al. |
| 2008/0195631 A1* | 8/2008 | Dom ................ G06F 17/30873 |
| 2010/0228741 A1* | 9/2010 | Maim .......................... 707/749 |
| 2011/0010365 A1* | 1/2011 | Garcia et al. ................. 707/726 |
| 2011/0040769 A1* | 2/2011 | Tseng et al. .................. 707/750 |
| 2011/0231390 A1* | 9/2011 | Inagaki et al. ............... 707/721 |
| 2011/0238644 A1 | 9/2011 | Dou et al. |
| 2012/0329032 A1 | 12/2012 | Fan et al. |
| 2014/0379528 A1* | 12/2014 | Martin ............... G06Q 30/0625 705/26.62 |
| 2015/0199417 A1* | 7/2015 | Ashparie ............. G06F 17/2785 707/737 |
| 2015/0262078 A1* | 9/2015 | Sarikaya ............. G06N 99/005 706/12 |

OTHER PUBLICATIONS

Office Action issued in U.S. Appl. No. 13/731,403 on Feb. 24, 2015, 14 pages.

\* cited by examiner

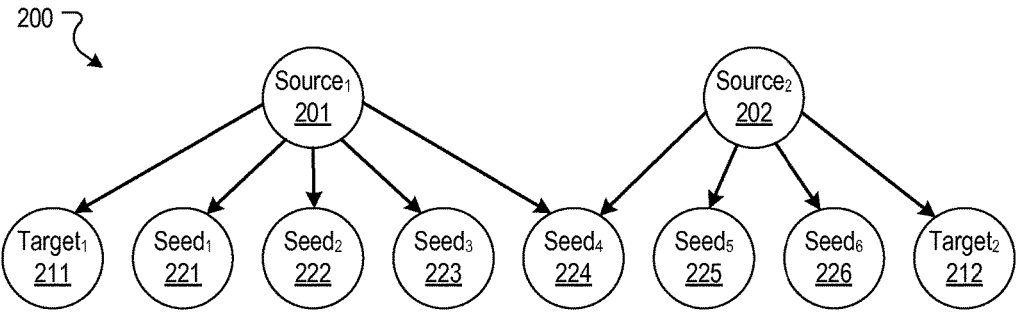
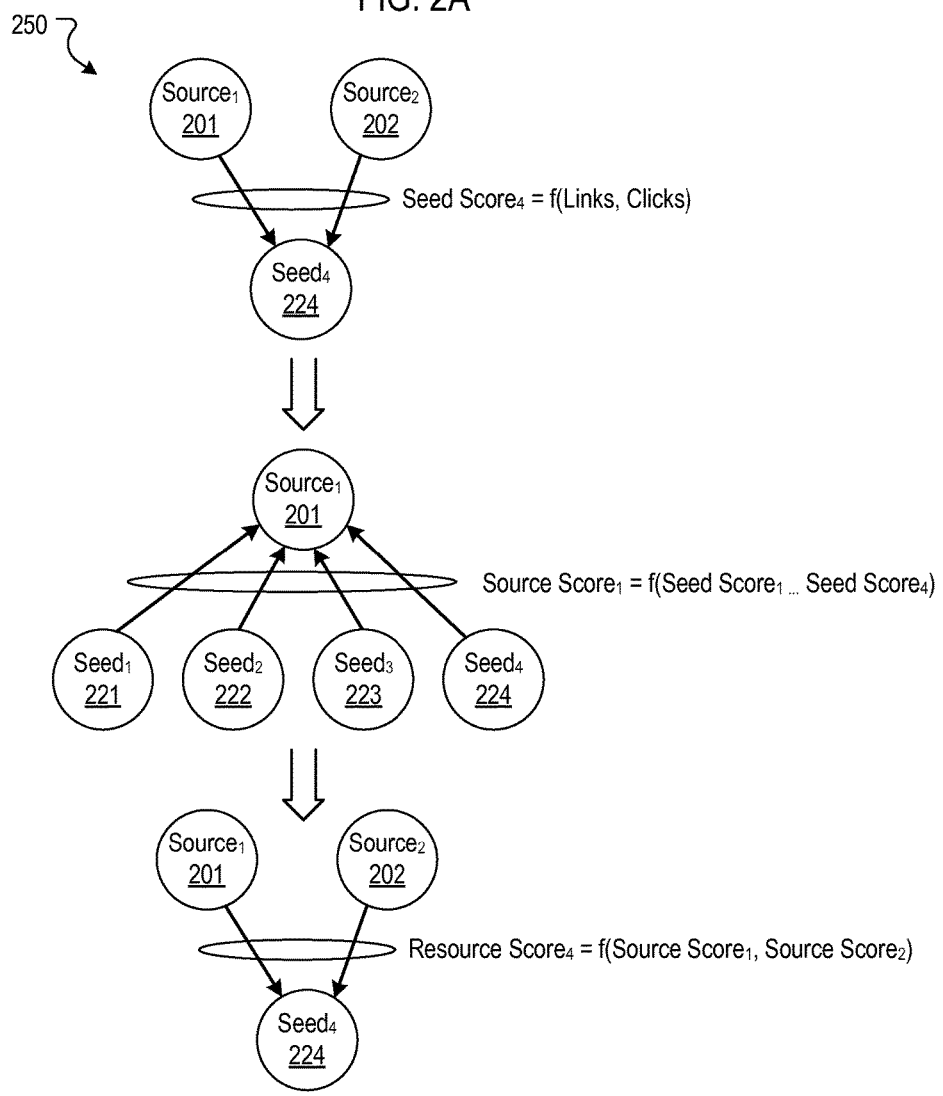
FIG. 2A
FIG. 2B

DETERMINING A QUALITY MEASURE FOR A RESOURCE

CROSS-REFERENCE TO RELATED APPLICATIONS

This application claims the benefit under 35 U.S.C. §119 (e) of U.S. Patent Application No. 61/731,936, entitled "DETERMINING A QUALITY MEASURE FOR A RESOURCE," filed Nov. 30, 2012, which is incorporated herein by reference in its entirety.

BACKGROUND

This specification relates to information retrieval.

The Internet provides access to a wide variety of resources, such as image files, audio files, video files, and web pages. A search system can identify resources in response to queries. The search system ranks the resources and provides search results that link to the identified resources. The search results are typically ordered for viewing according to the rank.

Some search systems rank each resource based, in part, on a number of other resources that include a link to the resource. For example, a resource that has a large number of resources that link to the resource may be ranked higher than another resource that has a smaller number of linking resources. However, some resources may be linked to by a number of resources that is disproportionate compared to the amount of traffic the resource receives from theses links.

SUMMARY

In general, one innovative aspect of the subject matter described in this specification can be embodied in methods that include the actions of determining a seed score for each seed resource in a set of seed resources, the seed score for a seed resource being based on a number of resources that each include a link to the seed resource and a number of selections of the links to the seed resource; identifying a set of source resources, each source resource in the set of source resources being a resource that includes a link to at least one of the seed resources; for each source resource, determining a source score, the source score for the source resource being based on the seed score for each seed resource linked to by a link in the source resource; identifying, for each source resource, source-referenced resources, each source-referenced resource being a resource linked to by a link in the source resource, and wherein the source-referenced resources include at least one resource that is not in the set of seed resources; and for each source-referenced resource, determining a resource score, the resource score for the source-referenced resource being based on the source score for each source resource that includes a link to the source-referenced resource. Other embodiments of this aspect include corresponding systems, apparatus, and computer programs, configured to perform the actions of the methods, encoded on computer storage devices.

These and other embodiments can each optionally include one or more of the following features. The seed resources, source resources, and the source-referenced resources can each include a web page. The seed score for each seed resource can be based on a ratio between the number of selections of links to the seed resource and the number of resources that each includes a link to the seed resource.

Determining a seed score for each seed resource can include determining a selection quality score for each selection of a link to the seed resource, the selection quality score being a measure of quality of the selection of the link to the seed resource; determining a seed selection quality score based on the selection quality scores; and determining the seed score for the seed resource based on the seed selection quality score, the number of resources that each include a link to the seed resource, and the number of selections of the links to the seed resource. The selection quality scores determined for the selections of links can include at least two values.

The quality measure for each selection can be based, in part, on a click duration determined for the selection. The selection quality score for each seed resource can be based on at least one of a number of selections having a click duration classified as a short click, a number of the selections having a click duration classified as a medium click, and a number of the selections having a click duration classified as a long click.

Aspects can further include adjusting a search result ranking of at least one of the source-referenced resources for a particular search query. The adjusting can be based on the resource score for the at least one source-referenced resource.

Each source resource having a source score that does not exceed a source score threshold can be classified as belonging to a source category. For each source-referenced resource for which at least one source resource of the source category includes a link: a number of source resources classified in the source category that includes a link to the source-referenced resource can be identified; and in a ranking process that ranks the source-referenced resource based, at least in part on the number of source resources that include a link to the source-referenced resource, the number of source resources can be discounted for the ranking process by the number of source resources classified in the source category that include a link to the source-referenced resource.

Aspects can further include, for each source resource: identifying anchor text for each link to another resource included in the source resource; identifying a set of n-grams for each identified anchor text; and assigning the source score for the source resource to each identified n-gram. Aspects can further include determining an n-gram score for each n-gram based on source scores assigned to the n-gram for each source resource having a link that includes the n-gram in anchor text for the link.

Another innovative aspect of the subject matter described in this specification can be embodied in methods that include the actions of, for each of a set of source resources: identifying a source score for the source resource, the source resource including at least one link to another resource, each link having associated anchor text for displaying the link; identifying a set of n-grams included in the anchor text of each link to another resource included in the source resource; and assigning the source score for the source resource to each identified n-gram; and for each n-gram identified from the set of source resources, determining an n-gram score for the n-gram based on the source scores assigned to the n-gram for each source resource having a link that includes the n-gram. Other embodiments of this aspect include corresponding systems, apparatus, and computer programs, configured to perform the actions of the methods, encoded on computer storage devices.

These and other embodiments can each optionally include one or more of the following features. Identifying a source score for a particular source resource can include receiving one or more seed scores for each seed resource for which the particular source resource includes a link and determining the source score based on the one or more seed scores.

Aspects can further include receiving query data specifying a search query; identifying one or more n-grams included in the search query; for each n-gram included in the search query, identifying the n-gram score for the n-gram; and determining a query score for the search query based on the n-gram score for each n-gram included in the search query.

Aspects can further include identifying search results responsive to the received query, each identified search result corresponding to a resource; identifying a rank score for each identified search result, the rank score for each identified search result being based, at least in part, on a resource count that indicates a number of resources that include a link to the search result's corresponding resource and a selection count that indicates a number of selections of links to the search result's corresponding resource; and adjusting the rank score for at least one of the search results based on the query score.

Adjusting the rank score for at least one of the search results based on the query score can include applying a first weighting factor to the resource count for the at least one search result to generate a weighted resource count, the first weighting factor being based on the query score; applying a second weighting factor to the selection count for the at least one search result to generate a weighted selection count, the second weighting factor being based on the query score; and determining an adjusted rank score for the at least one search result using the weighted resource count and the weighted selection count.

Adjusting the rank score for at least one of the search results based on the query score can include determining that the query score satisfies a threshold; and in response to determining that the query score satisfies the threshold, increasing an amount of influence the selection count has in determining the rank score for the at least one search result and decreasing an amount of influence the resource count has in determining the rank score for the at least one search result.

Adjusting the rank score for at least one of the search results based on the query score can include determining that the query score does not satisfy a threshold; and in response to determining that the query score does not satisfy the threshold, increasing an amount of influence the resource count has in determining the rank score for the at least one search result and decreasing an amount of influence the selection count has in determining the rank score for the at least one search result.

Particular embodiments of the subject matter described in this specification can be implemented so as to realize one or more of the following advantages. Search results for resources can be more accurately ranked using data regarding links to the resources and selections of those links. A seed score can be determined for a resource based on the number of links to the resource contained in other resources and a number of selections of those links. Source resources that include links to resources that have a disproportionate number of links relative to the number of selections, as indicated by the seed scores for those resources, can be identified. The links from these identified source resources can be discounted in a ranking process that ranks resources based on the number of links to the resource. Resources for which data regarding links are unavailable or insufficient can be scored using data regarding resources that include a link to the resource.

Search result rankings can be adjusted based on a search query's propensity to surface spam-related search results. The weighting of resource link counts in a ranking process can be reduced for search queries that have a high propensity for surfacing spam-related search results to reduce the skew on resource rankings caused by some resources having disproportionately large number of links compared to the number of selections of the links.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a block diagram illustrating a set of resources.

FIG. 2B is a block diagram of an example data flow for determining a resource score for a resource.

Like reference numbers and designations in the various drawings indicate like elements.

DETAILED DESCRIPTION

Figure 1:
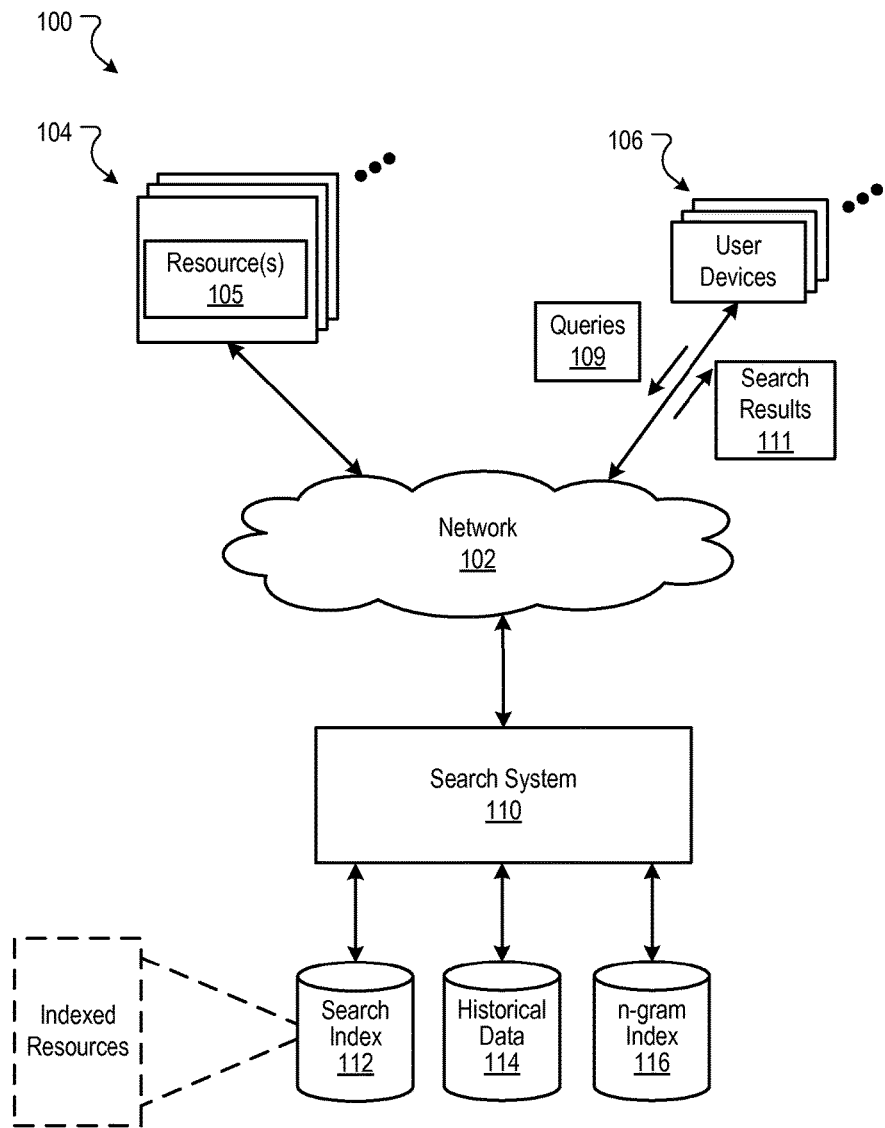
FIG. 1 is a block diagram of an example environment in which a search system provides search services.

A system can determine a measure of quality for a particular web resource based on the number of other resources that link to the particular web resource and the amount of traffic the resource receives. For example, a ranking process may rank a first web page that has a large number of other web pages that link to the first web page higher than a web page having a smaller number of linking web pages. However, some a resource may be linked to by a large number of other resources, while receiving little traffic from the links. For example, an entity may attempt to game the ranking process by including a link to the resource on another web page. This large number of links can skew the ranking of the resources. To prevent such skew, the system can evaluate the "mismatch" between the number of linking resources and the traffic generated to the resource from the linking resources. If a resource is linked to by a number of resources that is disproportionate with respect to the traffic received by use of those links, that resource may be demoted in the ranking process.

The evaluation of resources can be performed by a "pull-push" process. In an example pull-push process, a seed score is determined for each of a set of seed resources for which sufficient link and traffic data is available. The seed score for a particular seed resource is based on the number of source resources that link to the seed resource and the amount of traffic generated to the resource from the source resources. In some implementations, the seed score for a particular resource is the ratio between the number of selections of links to the particular resource and the number of source resources that link to the particular resource.

These seed scores are "pulled" up to the source resources and used to determine a source score for each source resource. In some implementations, the source score for a source resource is based on the seed score for each seed resource to which the source resource links. These source scores can be used to classify each source resource as being a "qualified source" or an "unqualified source."

The source scores can then be "pushed" to the resources to which the source resources link and used to determine a resource score for each of those resources. The resource score for a particular resource can be determined based on the source score for each source resource that links to the resource. The resources for which a resource score is determined can include the seed resources and target resources. In some implementations, the target resources are resources linked to by a source resource, but that are not used for determining the source score for the source resource. For example, a target resource may be a resource for which sufficient link and/or traffic data is unavailable for use in determining a seed score for the resource.

The resource scores can be used to rank the resources, for example in a search result ranking process. In some implementations, the system discounts links from source resources classified as unqualified sources in determining a rank score for a resource. In some implementations, the system demotes resources having a low resource score, e.g., a resource score that is less than a threshold resource score. In some implementations, a rank score used to rank the resources, such as a rank score based on relevance of the resource to the search query, is adjusted using the resource score for the resource.

In addition to resource scoring, the scores determined from the pull-push process have additional uses. For example, the system can use the resource scores to score queries based on their propensity for surfacing "spam-related" search results. The system can also adjust search result rankings for a received query using the query's score. For the purposes of this document, a spam-related search result is a search result for a resource in which the resources for which there is a disproportionately large number of links to the resource from other resources relative to the number of selections of those links. For example, a spam-related search result may be a search result for a resource for which the ratio between the number of links and the number of selections is greater than a threshold. Some categories of resources tend to include more spam-related resources than others. For example, publishers of many video sharing web sites attempt to manipulate rankings by creating links to the sites, resulting in a disproportionately large number of links compared to the number of selections, while national news web sites typically do not attempt such manipulation.

For queries that have a high propensity for surfacing spam-related web pages, the system can put a higher weight on selection counts for the search results and a lower weight on resource link counts for the search results when ranking the search results. Thus, the system can be said to "trust" the click counts more than the resource link counts for search queries that have a propensity for surfacing spam-related web pages.

The query score can be based on scores for n-grams included in the query. In general, the n-gram scores reflect the quality of resources that include links having anchor text that contain the n-grams. For each source resource that includes a link to another resource, the system can determine a quality score (e.g., source score) for the resource. For example, the quality score for a source resource can be based on seed scores for each seed resource for which the resource includes a link.

For each source resource, the system can break the anchor text for each link of the resource into a set of n-grams and assign the quality score for the resource to each n-gram. The system can determine an n-gram score for each n-gram by combining the quality scores assigned to the n-gram for each resource that includes a link having anchor text that includes the n-gram. For example, a particular n-gram may be found in anchor text for links displayed on several resources. The system can identify the quality score of each of the several resources and combine those scores to determine the n-gram score for the particular n-gram. The scores can be combined via a weighted average or a measure of central tendency, for example.

When a search query is received, the system can identify the n-grams of the search query and their respective scores. The system can combine these n-gram scores to determine the query score for the search query and use the query score to adjust a ranking of search results responsive to the search query.

FIG. 1 is a block diagram of an example environment 100 in which a search system 110 provides search services. A computer network 102, such as a local area network (LAN), wide area network (WAN), the Internet, a mobile phone network, or a combination thereof, connects web sites 104, user devices 106, and the search system 110. The environment 100 may include many web sites 104 and user devices 106.

A web site 104 is one or more resources 105 associated with a domain name and hosted by one or more servers. An example web site 104 is a collection of web pages formatted in hypertext markup language (HTML) that can contain text, images, multimedia content, and programming elements, such as scripts. Each web site 104 is maintained by a publisher, e.g., an entity that manages and/or owns the web site.

A resource 105 is any data that can be provided by a web site 104 over the network 102 and that is associated with a resource address. Resources 105 include HTML pages, word processing documents, portable format (PDF) documents, images, video, and feed sources, to name just a few. The resources 105 can include content, such as words, phrases, images, and sound, and may include embedded information, e.g., meta information and hyperlinks, and/or embedded instructions, e.g., scripts.

A user device 106 is an electronic device that is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource 105 to which the data corresponds. The indexed and, optionally, cached copies of the resources 105 are stored in a search index 112. The search index 112 can also include other data about the resources 105, such as one or more quality scores (e.g., seed scores, source scores, resource, scores, etc.) for the resources 105.

A user device, such as user device 106, can submit a search query 109 to the search system 110. The search system 110 performs a search operation that uses the search query 109 as input to identify resources 105 responsive to the search query 109. For example, the search system 110 may access the search index 112 to identify resources 105 that are relevant to the search query 109. The search system 110 identifies the resources 105, generates search results 111 that identify the resources 105, and returns the search results 111 to the user devices 106.

The search query 109 can include one or more search terms. A search term can, for example, include a keyword submitted as part of a search query 109 to the search system 110 that is used to retrieve responsive search results 111.

A search result 111 is data generated by the search system 110 that identifies a resource 105 that is responsive to a particular search query 109, and includes a link to the resource 105. An example search result 111 can include a web page title, a snippet of text or an image or portion thereof extracted from the web page, and a hypertext link, e.g., a uniform resource locator (URL), to the web page.

The search terms in the search query 109 can control the search results 111 that are identified by the search system 110. Although the actual ranking of the search results 111 varies based on the ranking process used by the search system 110, the search system 110 can retrieve and rank search results 111 based on the search terms submitted through a search query 109.

The user devices 106 receive the search results pages and render the pages for presentation to the users. In response to the user selecting a search result 111 at a user device 106, the user device 106 requests the resource identified by the resource locator included in the search result 111. The web site 104 hosting the resource 105 receives the request for the resource 105 from the user device 106 and provides the resource 105 to the requesting user device 106.

Data for the search queries 109 submitted during user sessions are stored in a data store, such as the historical data store 114. For example, for search queries that 109 are in the form of text, the text of the query is stored in the historical data store 114. For search queries 109 that are in the form of images, an index of the images is stored in the historical data store 114, or, optionally, the image is stored in the historical data store 114.

Selection data specifying actions taken in response to search results 111 provided in response to each search query 109 are also stored in the historical data store 114. These actions can include whether a search result 111 was selected, and for each selection, for which search query 109 the search result 111 was provided.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personal identifiable information can be determined for the user, or a user's geographical location may be generalized where location information is obtained (such as to a city, ZIP code, or state level), so that a particular location of a user cannot be determined. Thus, the user may have control over how information is collected about the user and used by a content server.

An n-gram index 116 stores data regarding n-grams, such as an index of n-grams and an n-gram score for each n-gram. As described in more detail below, the search system 110 can determine the n-gram score for each n-gram based on resources 105 that include the n-gram in anchor text for a link to another resource and store the n-gram scores in the index 116.

The search system 110 can score resources 105 using a "pull-push" process. In a pull-push process, the search system 110 identifies a set of seed resources for which sufficient link and traffic data is available and a set of source resources that each includes a link to at least one of the seed resources. The search system 110 can score each seed resource based on the link and traffic data for the seed resource and "pull" the seed scores for the seed resources to their respective source resources. A source score is determined for each source resource based on the seed scores pushed into the source resource and these source scores are "pushed" back into their respective seed resources. A resource score is then determined for each seed resource based on the source scores pushed into the seed resource. The source scores can also be distributed to other resources to which the source resources link, such as target resources for which sufficient link and traffic data is not available.

FIG. 2A is a block diagram illustrating a set of resources 200. For example, the set of resources 200 may include web pages or other data provided by web sites, similar to the resources 105 described above. The set of resources 200 includes source resources 201 and 202, seed resources 221-226, and target resources 211 and 212. Although a particular number of each type of resource is depicted in FIG. 2A, the set of resources 200 can include other numbers of source resources, seed resources, and target resources.

A source resource is a resource that includes a link to another resource. For example, the source resource 201 includes a link to the target resource 211, and a link to each of the seed resources 221-224. Similarly, the source resource 202 includes a link to the target resource 212 and to each of the seed resources 224-226. Selection of a link to a resource presented by a source resource causes a web browser to navigate to (e.g., request and present) the linked resource. For example, selection of the link to the target resource 211 presented by the source resource 201 may cause a web browser to navigate to the target resource 211.

The target resources 211 and 212 and the seed resources 221-226 are source-referenced resources. A source-referenced resource is a resource for which another resource, such as a source resource, includes a link. For the purposes of this document, a seed resource is a source-referenced resource for which data regarding the resource is used to determine a source score for one or more source resources that include a link to the seed resource. Conversely, a target resource is a source-referenced resource that is not used to determine a source score for a source resource. For example, a seed resource may be a resource for which sufficient data is available to determine a seed score for the resource. A target resource may be a resource for which sufficient data is not available to determine a seed score for the resource.

As described in more detail below, the seed score for a seed resource can be based on a number of resources that include a link to the seed resource and a number of selections of those links. If the search system 110 does not have access to this data for a particular resource, or if the amount of data for the particular resource is insufficient (i.e., less than a threshold number of linking resources or less than a threshold number of selections), the search system 110 may deem the particular resource a target resource, rather than a seed resource.

Although the resources are illustrated in FIG. 2A as being classified as either a source resource, a target resource, or a seed resource, the resources can be classified as more than one type of resource. For example, a seed resource may also be considered a source resource if the seed resource includes a link to another resource. Similarly, a target resource may also be considered a source resource if the target resource includes a link to another resource. To illustrate, if the seed resource 221 includes a link to the seed resource 222, then the seed resource would also be considered a source resource for the seed resource 222.

Figure 3:
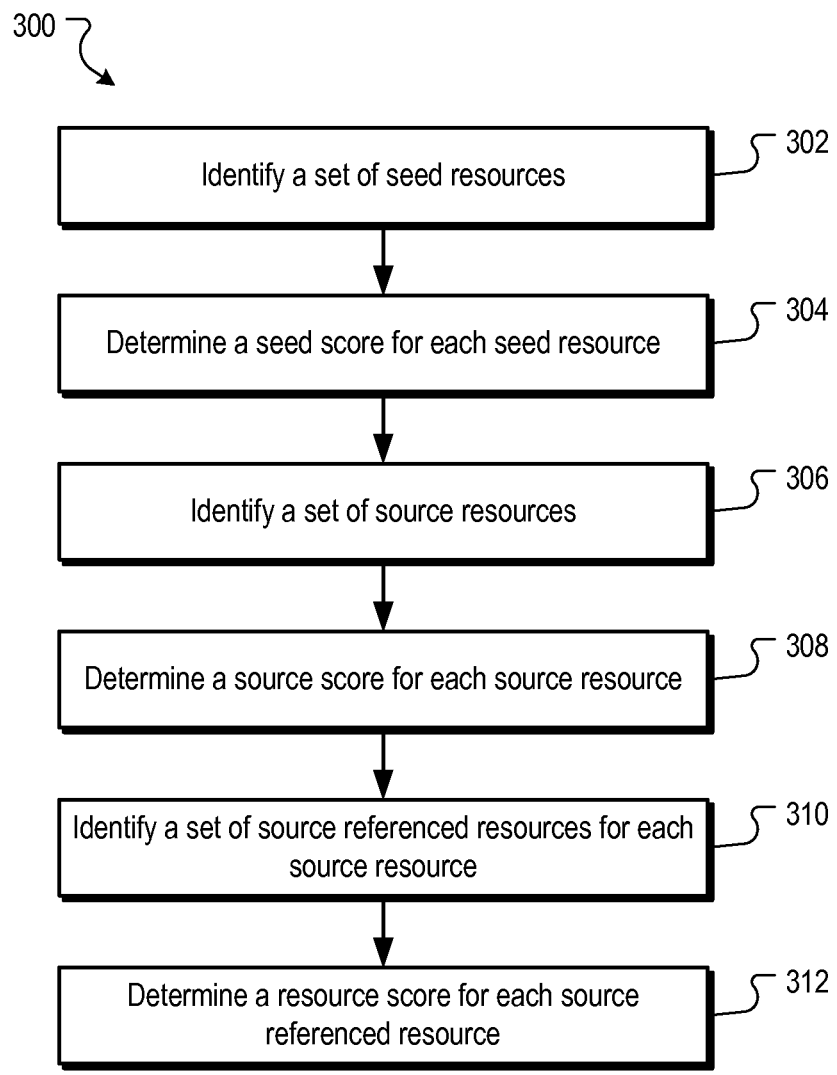
FIG. 3 is a flow chart of an example process for determining resource scores for a set of resources.

FIG. 2B is a block diagram of an example data flow 250 for determining a resource score for a resource, and FIG. 3 is a flow chart of an example process 300 for determining a resource score for a resource. The process 300 of FIG. 3 is described with reference to resources illustrated in FIGS. 2A and 2B. The example process 300 can, for example, be implemented by the search system 110 of FIG. 1.

A set of seed resources is identified (302). In some implementations, the search system 110 identifies, for inclusion in the set of seed resources, resources that are linked to by at least one source resource and that have sufficient data for determining a seed score for the resource. With reference to FIG. 2A, each of the seed resources 221-226 is linked to by at least one of the source resources 201, 202. These seed resources 221-226 may also include sufficient data for determining a seed score. Although the target resources 211 and 212 are linked to by one of the source resources 201, 202, the search system 110 may have insufficient data for determining a seed score for these target resources 211, 212. Thus, the target resources 211 and 212 may be excluded from the set of seed resources.

A seed score is determined for each seed resource of the set of seed resources (304). In general, the seed score for a seed resource can be considered a measure of quality for links to the seed resource. For example, the seed score for a seed resource may be based on a number of source resources that each includes a link to the seed resource ("resource link count") and a number of selections of those links ("selection count"). To illustrate, a seed resource that has a disproportionately large resource link count relative to its selection count may be assigned a low seed score as the links do not generate a proportional amount of traffic to the seed resource.

In some implementations, the resource link count for a seed resource is based on a number of source resources that each includes a link to the seed resource. For example, the resource link count may be the number of resources that each includes a link to the seed resource or proportional to the number of resources that each includes a link to the seed resource.

In some implementations, the selection count for a seed resource may be based on a number of selections of the links to the seed resource included in the source resources. For example, the selection count may be the number of selections or proportional to the number of selections. In some implementations, instead of or in addition to the selection count, the seed score for a resource may be based on other traffic measures, such as a total number of views for the resource, or a number of selections of search results for the resource. In some implementations, the selection score is determined or adjusted based on a quality of the selections, as described in detail with reference to FIG. 5.

In some implementations, the seed score for a seed resource is based on a ratio between the selection count and the resource link count for the seed resource. For example, the seed score may be the ratio or proportional to the ratio. The seed score for a seed resource may be based on a ratio between a total number of links to the seed resource and a number of selections of those links. For example, some source resources may include more than one link to a particular seed resource.

As an example, the seed score for the seed resource 224 is based on a function of the resource link counts for each of the source resources 201 and 202 that includes a link to the seed resource 224 and the selection counts for those links. The resource link count in this example would be two, as there are two source resources 201 and 202 that include a link to the seed resource 224. A seed score can similarly be determined for each of the other seed resources 221-223, 225, and 226 of FIG. 2A. For example, the seed score for the seed resource 221 may be based on a resource link count of one as a single source resource 201 includes a link to the resource, and a selection count based on the number of selections of the link to the seed resource 221 from the source resource 201.

A set of source resources is identified (306). In some implementations, the search system 110 identifies, for inclusion in the set of source resources, each source resource that includes a link to at least one of the seed resources in the set of seed resources. For example, the set of source resources for the example of FIG. 2A includes the source resources 201 and 202 as both resources include a link to at least one seed resource of the set of seed resources.

A source score is determined for each source resource of the set of source resources (308). In general, the source score for a source resource is a measure of quality for the source resource as a navigational link to other resources. In some implementations, the search system 110 determines the source score for a source resource based on the seed score for each seed resource for which the source resource includes a link. For example, the source score for a source resource may be the sum, average, weighted average, a measure of central tendency, or some other combination of the seed scores.

As an example, the source score for the source resource 201 may be based on the seed scores for each of the seed resources 221-224, as the source resource 201 includes a link to each of those resources. Similarly, the source score for the source resource 202 may be based on the seed scores for each of the seed resources 224-226, as the source resource 202 includes a link to each of those resources. As this example shows, the seed score for a seed resource, such as the seed resource 204, can affect the source score of multiple source resources if multiple resources include a link to the seed resource.

If a source resource includes a link to many seed resources that have low scores (e.g., many seed resources that have a disproportionately large number of source resources relative to the number of link selections), the source resource may be assigned a low source score. For example, the low seed scores of the source resource's seed resources may indicate that the source resource is a resource that includes links that do not generate a proportionate amount of traffic to the seed resources. Thus, the source resource may be assigned a lower source score than the source score for a source resource that includes links to seed resources that have higher seed scores.

As described above, a particular resource may be both a source resource and a seed resource. In such a case, a seed score may be determined for the particular resource and that seed score may be used to determine a source score for each source resource that includes a link to the particular resource. In addition, a source score may be determined for the particular resource using seed scores for each seed resource for which the particular resource includes a link. Thus, both a seed score and a source score maybe determined for the particular resource.

A set of source-referenced resources is identified (310). In some implementations, the search system 110 identifies, for inclusion in the set of source-referenced resources, each resource for which at least one of the source resources of the set of source resources includes a link. As an example, for the set of source resources that includes the source resources 201 and 202, the set of source-referenced resources includes as members the target resources 211 and 212, and the seed resources 221-226.

A resource score is determined for each source-referenced resource of the set of source-referenced resources (312). The resource score for a resource is a measure of quality for the resource and can be based on the quality of the source resources that link to the resource. For example, the resource score for a source-referenced resource may be based on the source score for each source resource that includes a link to the source-referenced resource. For example, the resource score for a resource may be the sum, average, weighted average, a measure of central tendency, or some other combination of the source scores.

As an example, the resource score for the seed resource 224 may be a function of the source score for the source resource 201 and the source score for the source resource 202. Similarly, the source score for each of the resources 211, and 221-223 may be based on the resource score for the source resource 201 as, in this example, the source resource 201 is the only source resource that includes a link to those resources. As illustrated by this example, a resource score is determined for target resources, such as the target resources 211 and 212. This enables the search system 110 to distribute link-based quality measures to resources for which sufficient data may not be available to determine a seed score.

In some implementations, the resource score for a resource is based on the source scores for the source resources that include a link to the seed resource and the seed score for the seed resource. For example, an overall source-based score may be determined based on the source scores and the overall source-based score can be combined with the seed score to determine the resource score for the resource. In this way, the resource score is indicative of the quality of the seed resource and the quality of the source resources that include a link to the seed resource.

In some implementations, the source-referenced resources (i.e., seed resources and target resources) can each be scored based on a classification of the source resources that include a link to the source-referenced resource. For example, each source resource may be classified as "qualified" or "unqualified" based on its source score. A qualified source is a source resource that generally links to seed resources that receive a proportional amount of traffic given the number of source resources that include a link to the seed resources. An unqualified resource is a source resource that generally links to seed resources that have a disproportionately large number of source resources given the number of selections of the links. If more qualified sources link to a particular resource than unqualified sources, the resource score for the particular resource may be higher than the resource score of another resource for which more unqualified sources include a link to the resource than qualified sources.

To classify the source resources, the search system 110 may compare the source score for each source resource to a threshold score. Source resources that have a source score that meets the threshold score may be classified as qualified, while source resources that have a source score that is less than the threshold score may be classified as unqualified. In some implementations, the search system 110 identifies the threshold score based on ratios between resource link counts and selections counts for known qualified sources and/or known unqualified sources. For example, the search system 110 may generate a sigmoid function, or other function, using the ratios and use the sigmoid function to classify the source resources.

The example implementation of FIG. 3 is described in terms of determining the seed scores, source scores, and resource scores using current data that is available at the time that the scores are determined. In some implementations, the seed scores, source scores, and resource scores are based, in part, on historical scores for the respective resources. For example, a seed resource may historically have had a very high seed score based on links to the seed resource receiving at least a proportional number of selections. If other resources that previously did not have a link to the seed resource add a link to the resource and those links do not generate traffic to the seed resource, the seed score for the seed resource may suddenly drop below its previous value if only current data is used. To account for this score change, the search system 110 may consider historical data, such as previous scores, when determining the scores for resources. In one example, a smoothing algorithm may be used to avoid sudden changes in scores. In another example, a score may be based on the weighted average of a particular number of previous scores and the score determined using current data. Each score can be weighted based on a period of time since the score was determined. In some implementations, if a score changes by at least a threshold amount, this score change may trigger the use of previous scores in the score determination, or may trigger human review to determine what caused the change. For example, a publisher's attempted manipulation may cause a spike in the score that triggers the use of historical data.

Although the example implementation of FIG. 3 is described in terms of resources, the seed scores, source scores, and resource scores can be determined in terms of domains, web sites, URLs, or partial URLs. For example, in a web site level implementation, the resource link counts and the selection counts for the resources of the web site may be aggregated to determine a resource link count and selection count for the web site. These aggregated counts can be used to determine a seed score for the web site. Similarly, the source score for a web site may be based on aggregated seed scores for resources for which resources of the web site include a link. Likewise, a resource count for a web site may be based on the source scores for each resource that includes a link to a resource of the web site.

As described above, seed scores for seed resources can be used in a pull-push process to score source resources that include a link to the seed resources. There are various different ways to determine a seed score. For example, the seed score may be based on current resource link count for the seed resource and a current selection count for the seed resource. In another example, the seed score can be based on a quality of the selections included in the selection count.

Figure 4:
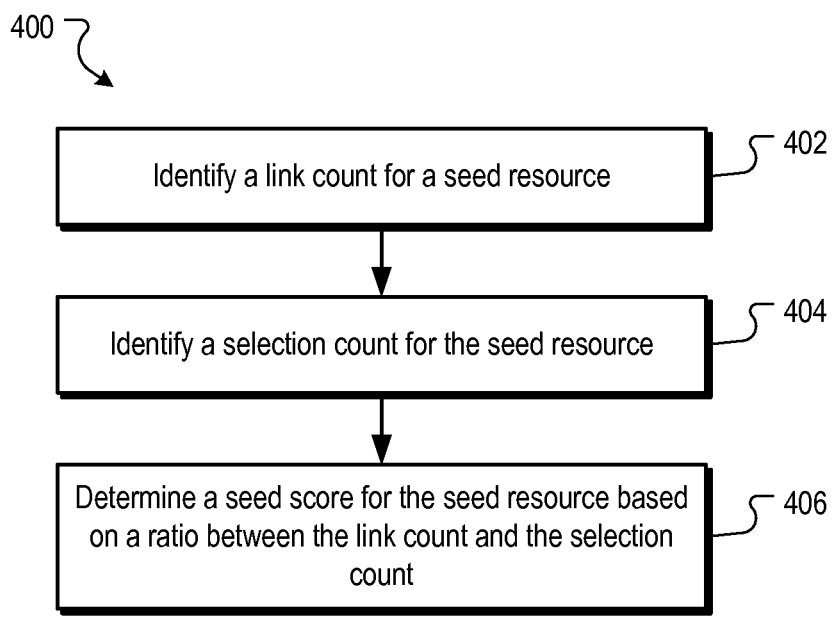
FIG. 4 is a flow chart of an example process for determining a seed score for a seed resource.

FIG. 4 is a flow chart of an example process 400 for determining a seed score for a seed resource. The example process 400 can, for example, be implemented by the search system 110 of FIG. 1. A resource link count for the seed resource is identified (402). The resource link count for the seed resource may be based on a number of resources that include a link to the seed resource. In some implementations, the search system 110 accesses the search index 112 to identify resources that include a link to the seed resource and determines a total number of indexed resources that include a link to the seed resource.

A selection count is identified for the seed resource (404). The selection count for the seed resource may be based on a number of times the link(s) to the seed resource that are included in other resource have been selected. This search system 110 may receive the selection data from a traffic analytics system, for example.

The seed score for the seed resource is determined (406). In some implementations, the seed score for the seed resource is the ratio between the selection count for the seed resource and the resource link count for the seed resource. In some implementations, the seed score is proportional to the ratio between the selection count for the seed resource and the resource link count for the seed resource.

As described above, the quality of the selections can also be used in determining the seed score. The search system 110 can account for low quality clicks when determining the seed score.

Figure 5:
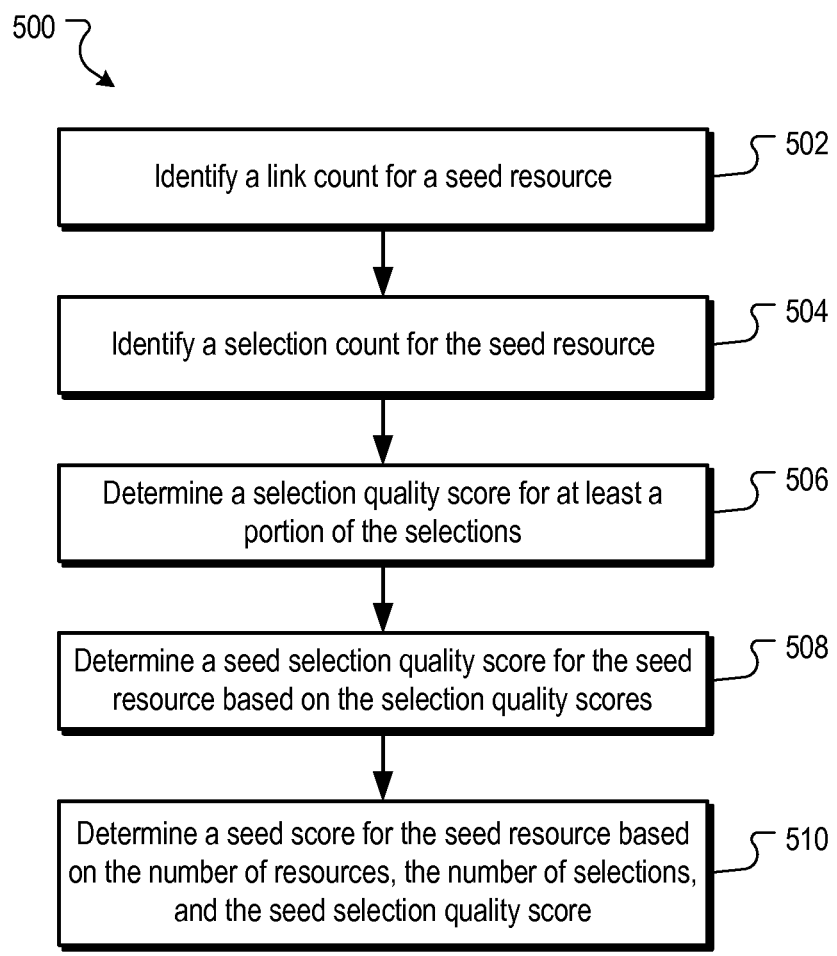
FIG. 5 is a flow chart of another example process for determining a seed score for a seed resource.

FIG. 5 is a flow chart of another example process 500 for determining a seed score for a seed resource. The example process 500 can, for example, be implemented by the search system 110 of FIG. 1. A resource link count is identified for the seed resource (502). As described above, the resource link count for the seed resource can be based on a number of resources that include a link to the seed resource.

A selection count is identified for the seed resource (504). The selection count for the seed resource may be based on a number of times the link(s) to the seed resource that are included in other resource have been selected.

A selection quality score is determined for at least a portion of the selections of the links to the seed resource (506). The selection quality score for a selection is a measure of quality for the selection and can be used to discount low quality selections when determining the seed score for the seed resource.

In some implementations, the selection quality score for a selection is based on a length of time a user dwells on the seed resource after selecting a link to the seed resource that was presented on one of its source resources. For example, the selection quality score may be higher for a selection that results in a long dwell time (e.g., greater than a threshold time period) than the selection quality score for a selection that results in a short dwell time (e.g., less than a threshold time period). As automatically generated link selections are often of a short duration, considering the dwell time in determining the seed score can account for these false link selections.

In some implementations, the selection quality score for a selection is based on whether one or more links presented by the seed resource were selected in response to the selection. For example, if the historical data shows that a user selected a link to the seed resource from a source resource, and then selected a link presented by the seed resource to navigate to another web page, this may be indicative that the selections were made by a real user rather than an automatically generated selection. Thus, the selection quality score for a selection may be higher if the selection resulted in a selection of a link at the seed resource than if the selection did not result in a selection of a link at the seed resource. In some implementations, the selection quality score for a selection is based on a combination of the dwell time and whether a link was selected at the seed resource.

A seed selection quality score is determined for the seed resource (508). In some implementations, the search system 110 determines the seed selection quality score for the seed resource using the selection quality scores for the selections of the links to the seed resource. For example, the seed selection quality score may be a sum of the individual selection quality scores, or a weighted sum of the individual selection quality scores. The seed selection quality scores may be weighted based on how recent the selections occurred, or other factors.

A seed score is determined for the seed resource (510). In some implementations, the search system determines the seed score for the seed resource using the resource link count, the selection count, and the seed selection quality score for the seed resource. For example, the seed score may be proportional to a product or sum of the resource link count, the selection count, and the seed selection quality score for the seed resource.

By way of another example, the seed score may be based on the resource link count and an adjusted selection count for the seed resource. In some implementations, the selection count is adjusted based on the seed selection quality score or based on the selection quality scores for the individual selections. For example, the search system 110 may reduce the selection count to account for selections that have a low selection quality score (e.g., less than a quality score threshold). Thus, the adjusted selection count for the seed resource may be based only on the number of high quality selections, for example the number of selections having a selection quality score that meets or exceeds the quality score threshold. The seed score may be proportional to a ratio between the adjusted selection count and the resource link count.

The resource scores can be used to rank the resources in search results for a received search query. For example, the search system 110 may use the resource scores in combination with relevance scores to rank the resources. In such a process, the resource score for a resource may serve as an overall quality measure for the resource and the relevance score for the resource may serve as a measure of relevance to the received search query. The resource scores may also be used to adjust the ranking of resources. For example, a resource having a sufficiently high resource score may be promoted in the ranking, while a resource having a sufficiently low resource score may be demoted in the ranking.

Figure 6:
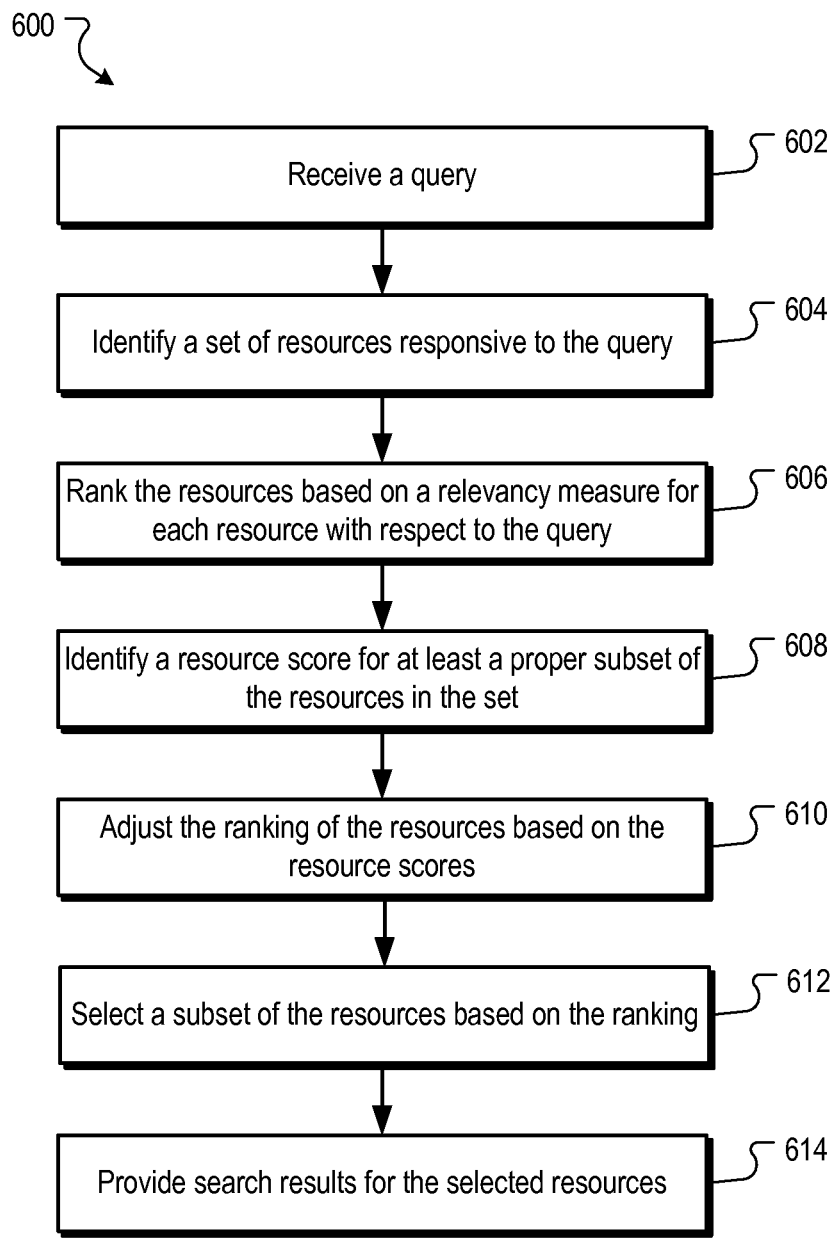
FIG. 6 is a flow chart of an example process for providing search results responsive to a search query.

FIG. 6 is a flow chart of an example process 600 for providing search results 111 responsive to a search query 109. The example process 600 can, for example, be implemented by the search system 110 of FIG. 1. A search query is received (602). For example, the search system 110 may receive a search query 109 from a user device 106.

A set of resources responsive to the search query 109 is identified (604). For example, the search system 110 may identify resources indexed in the search index 112 that are relevant to the search query 109. For each indexed resource 105, the search system 110 may identify a relevancy score for the resource 105 and identify, for inclusion in the set, resources having the highest relevancy scores. In general, the relevancy score for a resource is a measure of relevancy of the resource to the search query. For example, a resource having a higher relevancy score with respect to the search query than the relevancy score of another resource may be considered more relevant to the search query than the other resource.

The resources in the set are ranked based, at least in part, on the relevancy scores (606). For example, the search system 110 may order the resources from highest to lowest relevancy scores.

The ranking of the resources is adjusted based on resource scores for the resources (610). In some implementations, the search system 110 demotes in the ranking resources that have a low resource score. For example, the search system 110 may demote resources that have a resource score that is less than a first threshold resource score. In some implementations, the search system 110 promotes in the ranking resources that have a high resource score. For example, the search system 110 may promote resources having a resource score that meets or exceeds a second threshold resource score. The ranking of resources that have a resource score between the first and second threshold resource scores may not be adjusted, for example.

In some implementations, the search system 110 adjusts the relevancy scores, or other scores used to rank the resources, using the resource scores. For example, the search system 110 may determine an adjusted rank score for each resource, where the adjusted rank score for a particular resource is based on the relevancy score for the resource and the resource score for the resource. The search system 110 can re-order the ranking based on the adjusted rank scores.

A proper subset of the resources is selected based on the adjusted ranking (612). For example, the search system 110 may select a proper subset of the resources that are the highest ranked or that have the highest adjusted rank scores.

Search results 111 are provided for the resources of the proper subset (614). The search system 110 may generate a search result 111 for each resource of the proper subset and provide the search results 111 to the user device 106 from which the search query 109 was received. In turn, the user device 106 can present the search results, for example in order based on the rank of the resources referenced by the search results 111.

Another process for ranking resources based on scores for the resources includes discounting links that are included on unqualified resources, as the search system 110 may not "trust" such links. For example, the search system 110 may rank the resources based on a rank score that is determined using an adjusted link count and a relevancy score for the resource. The adjusted link count for a resource is indicative of the number of qualified resources that include a link to the resource.

Figure 7:
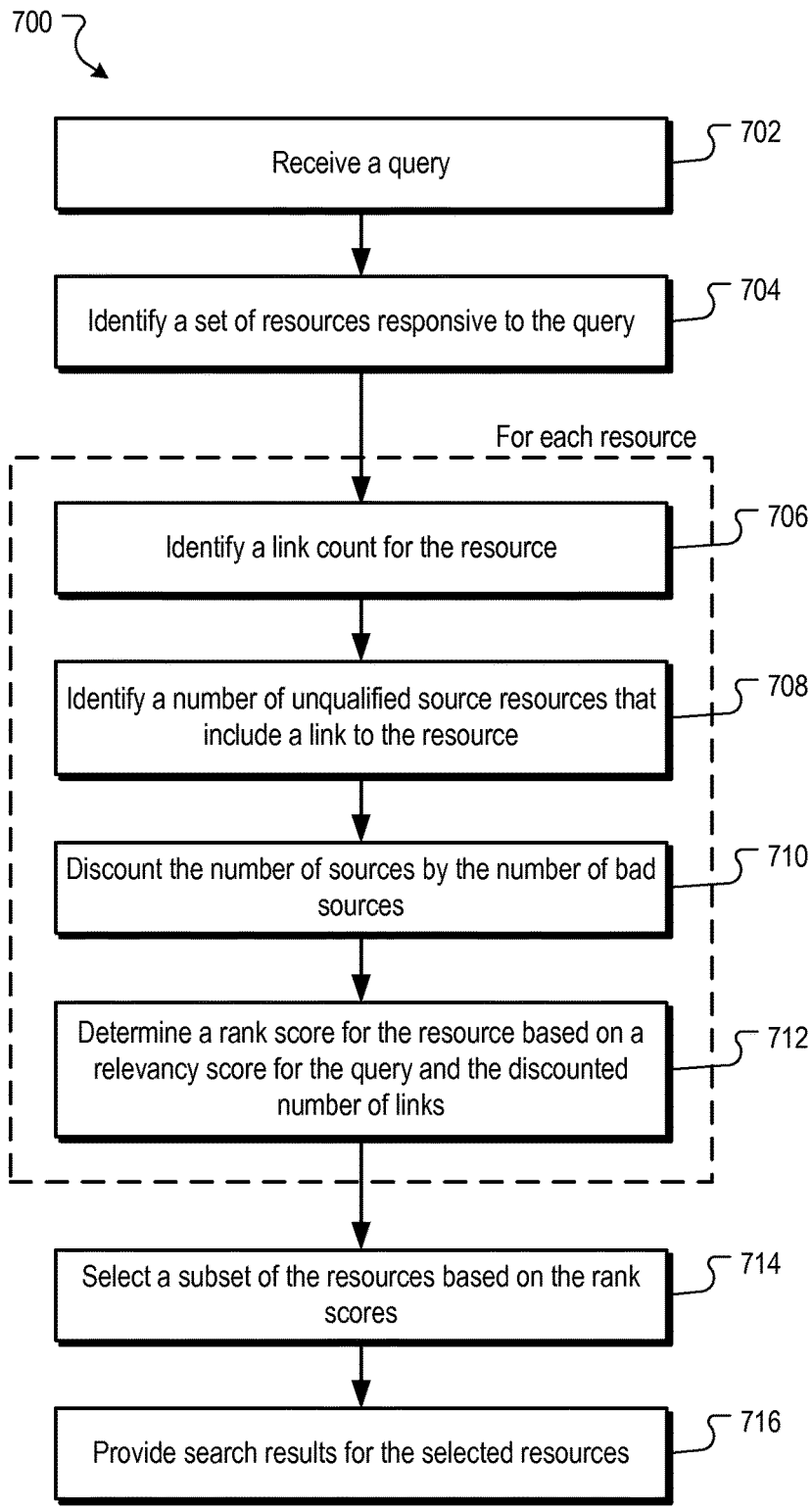
FIG. 7 is a flow chart of another example process for providing search results responsive to a search query.

FIG. 7 is a flow chart of another example process for providing search results 111 responsive to a search query 109. The example process 700 can, for example, be implemented by the search system 110 of FIG. 1. A search query 109 is received (702). For example, the search system 110 may receive the search query 109 from a user device 106.

A set of resources responsive to the search query 109 is identified (704). For example, the search system 110 may identify resources indexed in the search index 112 that are relevant to the search query 109, as described above.

A resource link count is identified for each resource of the set of resources (706). As described above, the resource link count for a particular resource can be based on a number of source resources that include a link to the particular resource.

A number of unqualified sources is identified for each resource of the set of resources (708). As described above, an unqualified source may be a source resource that has a source score that is less than a threshold score.

For each resource of the set of resources, the resource link count for the resource is discounted by the number of unqualified sources that include a link to the resource to determine an adjusted resource link count (710). For example, the search system 110 may determine the adjusted resource link count for a resource by determining the difference between the resource link count for the resource and the number of unqualified sources that include a link to the resource.

A rank score is determined for each resource (712). In some implementations, the rank score for a resource is based on a relevancy score for the resource with respect to the search query 109 and the adjusted resource link count. For example, the search system 110 may provide the relevancy score and adjusted resource link count to a ranking process that ranks resources based, in part, on the resource link counts for the resources. By using the adjusted resource link count rather than the actual resource link count, the ranking does not give a resource credit for links included on unqualified sources.

A proper subset of the resources is selected based on the rank scores (714). For example, the search system 110 may select a proper subset of the resources that are the have the highest rank scores.

Search results 111 are provided for the resources of the proper subset (716). The search system 110 may generate a search result 111 for each resource of the proper subset and provide the search results 111 to the user device 106 from which the search query 109 was received. In turn, the user device 106 can present the search results, for example in order based on the rank of the resources referenced by the search results 111.

The scores for the resources described above have additional uses. For example, the source scores for the source resources can be used to score search queries based on their propensity for surfacing spam-related search results. The query score for a search query may be based on scores for n-grams included in the search query. These n-gram scores used to determine the query score may be based on source scores for source resources that include the n-gram in anchor text for a link presented on the source resource. Thus, the query score for a search query is indicative of the quality of the source resources that include text of the search query.

To illustrate, consider the n-gram "payday loan." This n-gram may be common in anchor text for links to payday loan sites for which there may be a disproportionately large number of links to the site compared to the number of selections the links receive. Thus, the n-gram may have a low n-gram score. If this n-gram is included in the search query, then the query score will reflect its n-gram score, which if low indicates that the n-gram is found in unqualified resources and that the search query is likely to surface resources that are linked to by unqualified resources.

Figure 8:
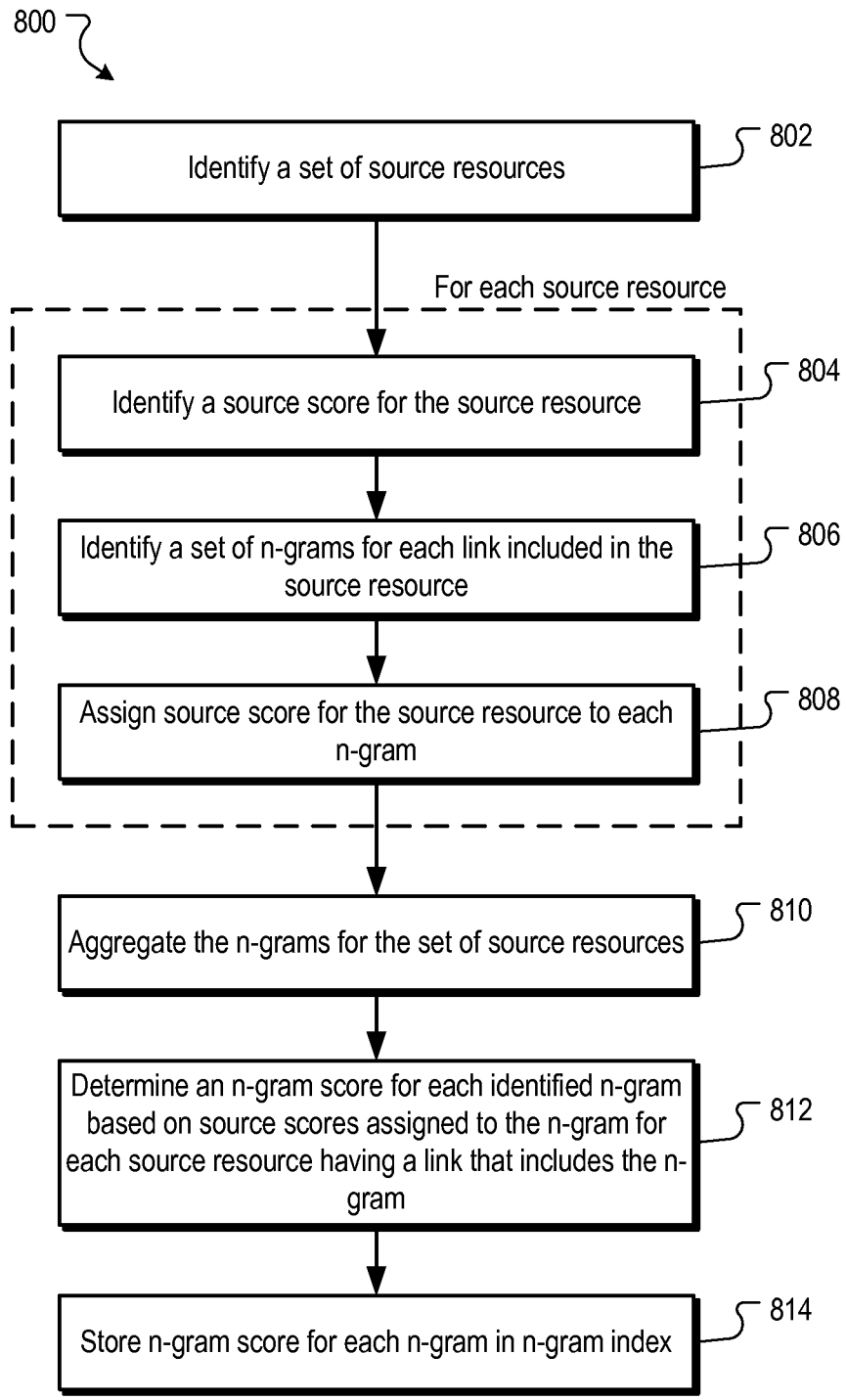
FIG. 8 is a flow chart of an example process for determining an n-gram score.

FIG. 8 is a flow chart of an example process 800 for determining an n-gram score. The example process 800 can, for example, be implemented by the search system 110 of FIG. 1. A set of source resources is identified (802). For example, the search system 110 may identify each source resource indexed in the search index 112, or a subset thereof.

A source score is identified for each source resource of the set of source resources (804). In some implementations, the search system 110 determines the source score for a particular source resource using the seed scores for each seed resource for which the source resource includes a link, as described above.

For each source resource of the set of source resources, the search system 110 identifies a set of n-grams (806). In some implementations, the set of n-grams for a particular resource includes n-grams of anchor text included in the source resource. Anchor text is the visible, selectable text of a hyperlink. To identify the n-grams for a source resource, the search system 110 can identify the links contained in the source resource. For each identified link, the search system 110 can parse the anchor text for the link to identify the n-grams included in the anchor text.

For each source resource, the source score for the source resource is assigned to each n-gram of the set of n-grams for the source resource (808). For example, if the search system 110 identified ten distinct n-grams in the anchor text of a particular source resource, the search system 110 can assign the source score for the particular source resource to each of the ten n-grams.

The n-grams for the set of source resources are aggregated (810). The search system 110 can create a set of n-grams that includes the set of n-grams for each source resource of the set of resources. As a particular n-gram may be included in the n-gram set of multiple source resources, some n-grams may have more than one assigned source score. For example, if an n-gram is a member of the set of n-grams for a first resource that has a source score of 1.2, and a member of the set of n-grams for a second resource that has a source score of 2.7, the n-gram may be assigned a score of 1.2 and 2.7. These individual scores are maintained for each n-gram, for example in the n-gram index 116.

An n-gram score is determined for each n-gram in the set of n-grams (812). The search system 110 can determine the n-gram score for each n-gram using the individual source scores assigned to the n-gram. Continuing the previous example, the n-gram score for the particular n-gram may be based on the source score of 1.2 and the source score of 2.7. The n-gram score for an n-gram may be the sum, average, weighted average, a measure of central tendency, or some other combination of the individual source scores for the n-gram.

The n-gram scores are stored (814). For example, the search system 110 can store the n-gram scores in the n-gram index 116 with reference to their respective n-grams.

After determining the n-gram scores, the n-gram scores are used to determine query scores for search queries received by the search system 110, as described above. The query score can then be used to rank or adjust the ranking of search results for the search query. For example, if the query score indicates that the search query has a high propensity for surfacing spam-related resources, the search system 110 can reduce the influence of link counts in the ranking process as these resources are more likely to be resources for which there are a large number of links to the resources relative to the number of selections of the links.

Figure 9:
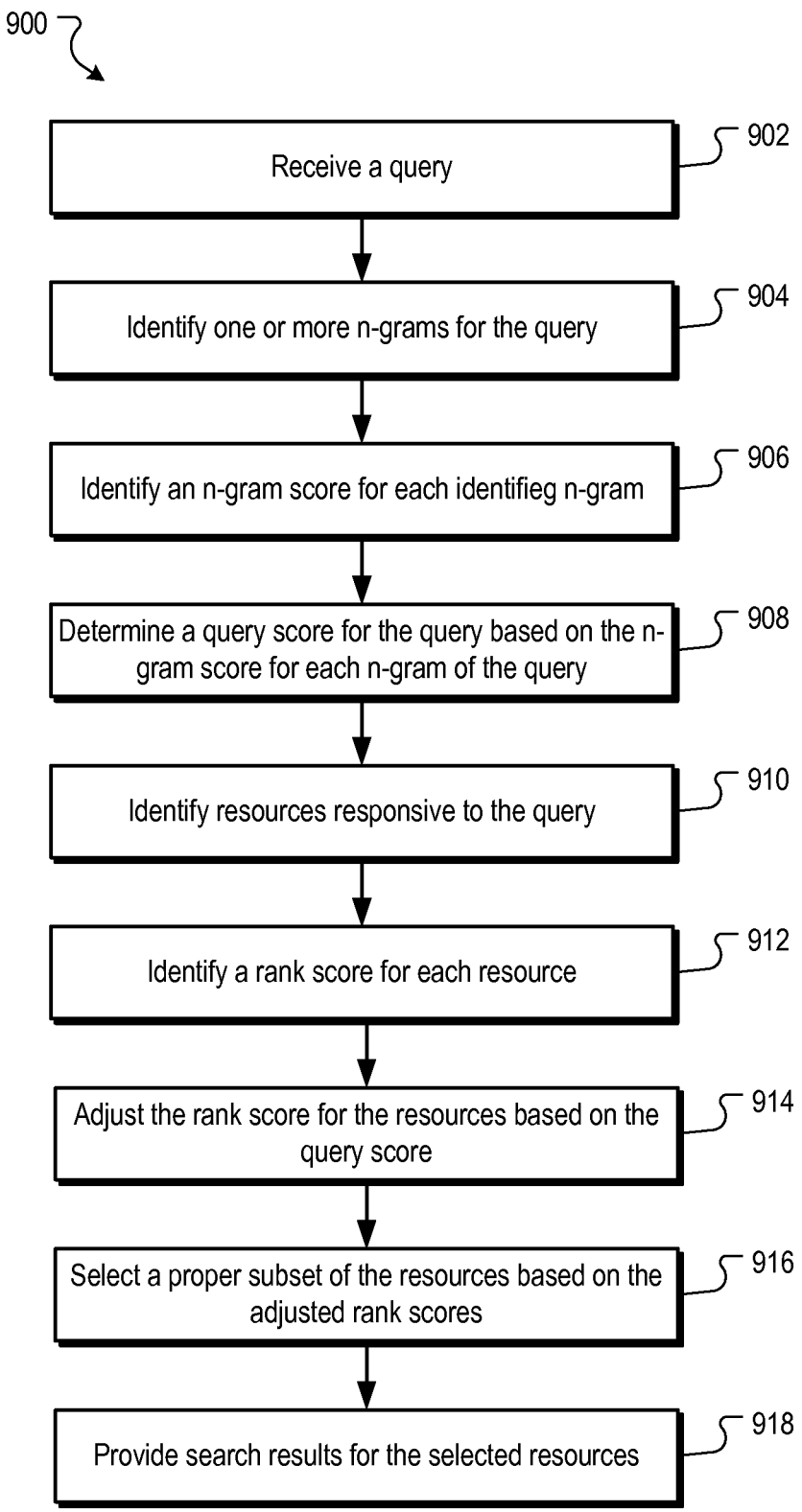
FIG. 9 is a flow chart of another example process for providing search results responsive to a search query.

FIG. 9 is a flow chart of another example process 900 for providing search results 111 responsive to a search query 109. The example process 900 can, for example, be implemented by the search system 110 of FIG. 1. A search query 109 is received (902). For example, the search system 110 may receive the search query 109 from a user device 106.

One or more n-grams are identified for the search query 109 (904). In some implementations, the search system 110 parses the search query 109 to identify the one or more n-grams of the search query 109.

An n-gram score is identified for each n-gram of the search query 109 (906). For example, the search system 110 can access the n-gram index 116 to identify the n-gram scores for the n-grams.

A query score is determined for the search query 109 (908). In some implementations, the search system 110 determines the query score for a search query 109 based on the n-gram scores for at least a portion of the n-grams identified for the search query 109. As some n-grams of the search query may not have an n-gram score, the query score may not be based on every n-gram of the search query. For example, a search query 109 may have five n-grams. In such an example, the query score for the search query may be based on the n-gram score for each of the five n-grams, if an n-gram score is available for each of the five n-grams. If an n-gram score is available for only three of the five n-grams, the query score may be based on the three available n-gram scores. The query score for a search query may be the sum, average, weighted average, a measure of central tendency, or some other combination of the individual n-gram scores.

The query score can indicate a measure of propensity for the search query 109 to surface spam-related resources. For example, if the n-grams of the search query 109 are included in anchor text for many unqualified sources, then the n-gram scores are likely to be low, causing the query score to also below. Thus, a low query score can indicate that the search query 109 is likely to surface resources associated with unqualified, and potentially spam-related source resources.

In some implementations, the search system 110 adjusts the query score based on the n-gram score for the entire search query 109. For example, the search query 109 itself is an n-gram that may have an n-gram score in the n-gram index 116. This n-gram score can be combined with the query score determined using the individual n-gram scores to determine an adjusted query score. This adjusted query score can, in some implementations, correct for individual terms in the search query having n-gram scores that have a high propensity for surfacing spam-related resources. For example, consider the search query "Atlanta ER." Although the overall query and the term "Atlanta" may not typically surface spam sites, the search query may receive a low query score because of the term "ER" as this term may be found in links to video sharing sites that include episodes of the television show. Thus, the n-gram "ER" may have a low n-gram score, causing the search query "Atlanta ER" to have a lower than expected query score. To account for this lower than expected n-gram score, the search system 110 may adjust the query score based on the n-gram score for "Atlanta ER" to be more representative of the actual query. For example, the adjusted query score may be the average of the query score and the n-gram score for the search query.

A set of resources responsive to the search query 109 is identified (910). For example, the search system 110 may identify resources indexed in the search index 112 that are relevant to the search query 109. For each indexed resource, the search system 110 may identify a rank score for the resource (912). As described above, the rank score for a resource may be based on a relevancy score for the resource and a resource score for the resource.

The rank score for at least a portion of the resources is adjusted based on the query score (914). In some implementations, the search system 110 determines an adjusted rank score for resources based on the query score. For example, a low query score may indicate that the search query 109 has a high propensity for surfacing spam-related search results. For low query scores, the search system 110 may not "trust" the resource link counts for the identified resources. For example, if the search query 109 is "payday loans," the responsive resources (e.g., payday loan web pages) may have large link counts relative to the selections of the links. A high query score may indicate that the search query has a low propensity for surfacing spam-related resources. For high query scores, the search system may "trust" the resource link counts more.

To account for potential manipulation to resource link counts by spam-related resources, the search system 110 can weight the resource link count and/or selection count in a rank score computation based on the query score. For low query scores in which the search system 110 may not trust the resource link counts, the weighting of the resource link counts may be lower than the weighting of the resource link counts for high query scores. Similarly, for low query scores, the weighting of the selection count may be higher than the weighting of the selection counts for high query scores. Example processes for adjusting rank scores based on a query score are illustrated in FIGS. 10 and 11, and described below.

A proper subset of the resources is selected based on the rank scores (916). For example, the search system 110 may select a proper subset of the resources that are the have the highest rank scores.

Search results 111 are provided for the resources of the proper subset (918). The search system 110 may generate a search result 111 for each resource of the proper subset and provide the search results 111 to the user device 106 from which the search query 109 was received. In turn, the user device 106 can present the search results, for example in order based on the rank of the resources referenced by the search results 111.

Figure 10:
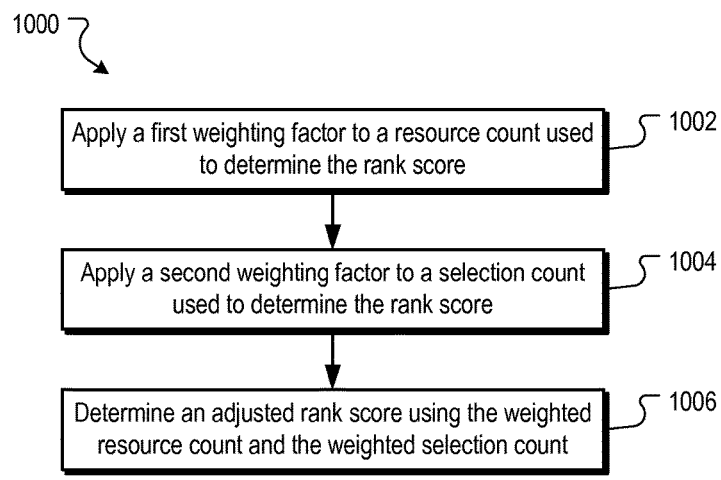
FIG. 10 is a flow chart of an example process for determining an adjusted rank score for a resource.
Figure 11:
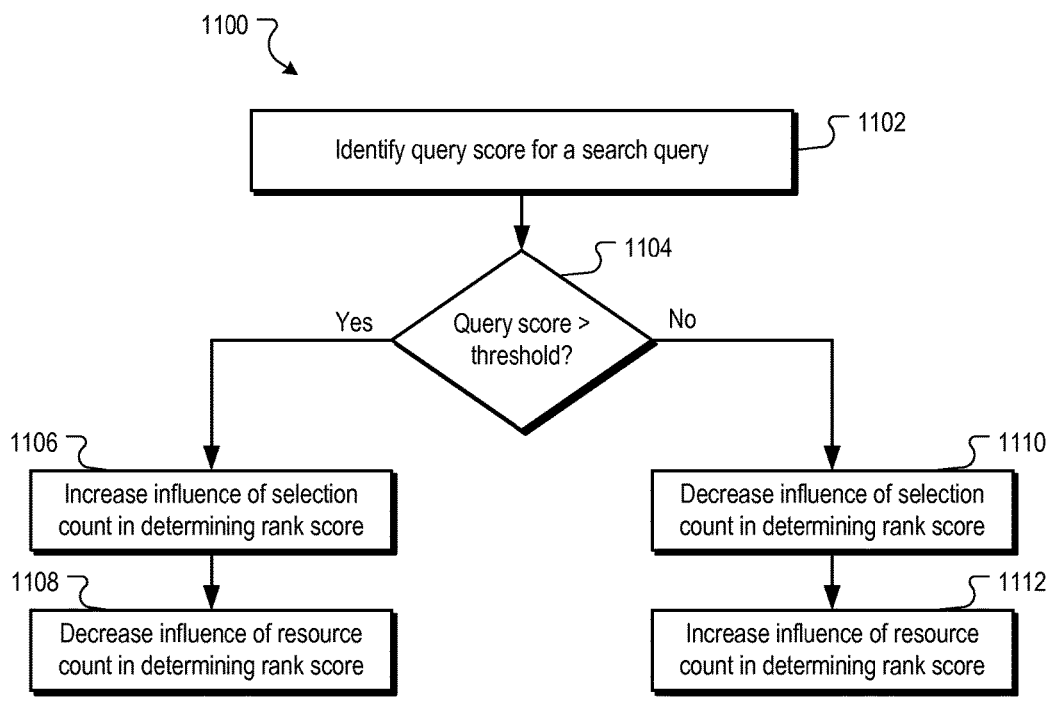
FIG. 11 is a flow chart of an example process for adjusting a weighting of a resource count and a weighting for a selection count for determining a rank score.

FIG. 10 is a flow chart of an example process 1000 for determining an adjusted rank score for a resource. The example process 1000 can, for example, be implemented by the search system 110 of FIG. 1. A first weighting factor is applied to a resource link count for the resource to determine an adjusted resource link count (1002). The first weighting factor can be identified based on a query score for a search query for which the resource has been identified. For example, if the query score is low, the first weighting factor may also be low. If the query score is high, the first weighting factor may also be high.

A second weighting factor is applied to a selection count for the resource to determine an adjusted selection count (1004). The second weighting factor can be identified based on a query score for the search query for which the resource has been identified. For example, if the query score is low, the second weighting factor may be low. If the query score is high, the second weighting factor may be high.

An adjusted rank score is determined for the resource (1006). In some implementations, the search system 110 determines the adjusted rank score using the adjusted resource link count and the adjusted selections count. The adjusted rank score may also be based on a non-adjusted rank score for the resource and/or a relevancy score for the resource with respect to the search query 109.

FIG. 11 is a flow chart of an example process 1100 for adjusting a weighting of a resource count and a weighting for a selection count for determining a rank score. The example process 1000 can, for example, be implemented by the search system 110 of FIG. 1. A query score for a search query 109 is identified. For example, the search system 110 may determine the query score using n-gram scores for a search query as described above.

A determination is made whether the query score exceeds a threshold score (1104). For example, the search system 110 may compare the query score to a threshold score specified by a system designer for example.

If the query score exceeds the threshold score, the search system 110 increases the influence of a selection count for determining a rank score for a resource (1106). For example, the search system 110 may increase a weighting factor for the selection count. The search system 110 also decreases the influence of a resource link count for determining the rank score for the resource (1108). For example, the search system 110 may decrease a weighting factor for the resource link count.

If the query score does not exceed the threshold score, the search system 110 decreases the influence of the selection count for determining the rank score for the resource (1110). For example, the search system 110 may decrease a weighting factor for the selection count. The search system 110 also increases the influence of a resource link count for determining the rank score for the resource (1112). For example, the search system 110 may increase a weighting factor for the resource link count.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   determining a seed score for each seed resource in a set of seed resources in accordance with a seed selection quality score,
      the seed score for a seed resource being based on a total number of resources that each include a link to the seed resource and a total number of selections of the links to the seed resource, each selection counted in the total number of selections being a selection by a respective user causing a navigation to the seed resource, and
      the seed selection quality score representing qualities of selections of the links to the seed resource;
   identifying a set of source resources, each source resource in the set of source resources being a resource that includes a link to at least one of the seed resources;
   for each source resource, determining a source score, the source score for the source resource being based on the seed score for each seed resource linked to by a link in the source resource;
   identifying, for each source resource, source-referenced resources, each source-referenced resource being a resource linked to by a link in the source resource, and wherein the source-referenced resources include at least one resource that is not in the set of seed resources; and,
   for each source-referenced resource, determining a resource score, the resource score for the source-referenced resource being based on the source score for each source resource that includes a link to the source-referenced resource.

2. The method of claim 1, wherein the seed resources, source resources, and the source-referenced resources each comprise a web page.

3. The method of claim 1, wherein the seed score for each seed resource is based on a ratio between the total number of selections of the links to the seed resource and the total number of resources that each include a link to the seed resource.

4. The method of claim 1, wherein determining a seed score for each seed resource comprises:
   determining a selection quality score for each selection of a link to the seed resource, the selection quality score being a measure of quality of the selection of the link to the seed resource;
   determining the seed selection quality score based on the selection quality scores; and
   determining the seed score for the seed resource based on the seed selection quality score, the total number of resources that each include a link to the seed resource, and the total number of selections of the links to the seed resource,
   wherein the selection quality scores determined for the selections of the links include at least two distinct values.

5. The method of claim 4, wherein the quality measure for each selection causing a navigation to a respective resource is based, in part, on a click duration determined for the selection, wherein the click duration represents a length of time the user making the selection dwelled on the resource after making the selection.

6. The method of claim 5, wherein the selection quality score for each seed resource is based on at least one of a total number of selections having a click duration classified as a short click, a total number of the selections having a click duration classified as a medium click, or a total number of the selections having a click duration classified as a long click.

7. The method of claim 1, further comprising adjusting a search result ranking of at least one of the source-referenced resources for a particular search query, the adjusting being based on the resource score for the at least one source-referenced resource.

8. The method of claim 1, further comprising:
   classifying each source resource having a source score that does not exceed a source score threshold as an unqualified resource;
   for each source-referenced resource for which at least one unqualified includes a link:
      identifying a total number of source resources classified as unqualified resources that include a link to the source-referenced resource; and,
      in a ranking process that ranks the source-referenced resource based, at least in part on the total number of source resources that include a link to the source-referenced resource, discounting the total number of source resources for the ranking process by the total number of source resources classified as unqualified resources that include a link to the source-referenced resource.

9. The method of claim 1, further comprising:
   for each source resource:
      identifying anchor text for each link to another resource included in the source resource;
      identifying a set of n-grams for each identified anchor text by breaking the anchor text for each link into n-grams; and,
      assigning the source score for the source resource to each identified n-gram.

10. The method of claim 9, further comprising determining an n-gram score for each n-gram based on source scores assigned to the n-gram for each source resource having a link that includes the n-gram in anchor text for the link.

11. A system, comprising:
   a data processing apparatus; and,
   a memory storage apparatus in data communication with the data processing apparatus, the memory storage apparatus storing instructions executable by the data processing apparatus and that upon such execution cause the data processing apparatus to perform operations comprising:
      determining a seed score for each seed resource in a set of seed resources in accordance with a seed selection quality score,
         the seed score for a seed resource being based on a total number of resources that each include a link to the seed resource and a total number of selections of the links to the seed resource, each selection counted in the total number of selections being a selection by a respective user causing a navigation to the seed resource, and
         the seed selection quality score representing qualities of selections of the links to the seed resource;

identifying a set of source resources, each source resource in the set of source resources being a resource that includes a link to at least one of the seed resources;

for each source resource, determining a source score, the source score for the source resource being based on the seed score for each seed resource linked to by a link in the source resource;

identifying, for each source resource, source-referenced resources, each source-referenced resource being a resource linked to by a link in the source resource, and wherein the source-referenced resources include at least one resource that is not in the set of seed resources; and, for each source-referenced resource, determining a resource score, the resource score for the source-referenced resource being based on the source score for each source resource that includes a link to the source-referenced resource.

12. The system of claim 11, wherein the seed score for each seed resource is based on a ratio between the total number of selections of the links to the seed resource and the total number of resources that each include a link to the seed resource.

13. The system of claim 11, wherein determining a seed score for each seed resource comprises:
determining a selection quality score for each selection of a link to the seed resource, the selection quality score being a measure of quality of the selection of the link to the seed resource;
determining the seed selection quality score based on the selection quality scores; and,
determining the seed score for the seed resource based on the seed selection quality score, the total number of resources that each include a link to the seed resource, and the total number of selections of the links to the seed resource,
wherein the selection quality scores determined for the selections of the links include at least two distinct values.

14. The system of claim 13, wherein the quality measure for each selection causing a navigation to a respective resource is based, in part, on a click duration determined for the selection, wherein the click duration represents a length of time the user making the selection dwelled on the resource after making the selection.

15. The system of claim 14, wherein the selection quality score for each seed resource is based on at least one of a total number of selections having a click duration classified as a short click, a total number of the selections having a click duration classified as a medium click, or a total number of the selections having a click duration classified as a long click.

16. The system of claim 11, wherein the instructions upon such execution cause the data processing apparatus to perform further operations comprising adjusting a search result ranking of at least one of the source-referenced resources for a particular search query, the adjusting being based on the resource score for the at least one source-referenced resource.

17. The system of claim 11, wherein the instructions upon such execution cause the data processing apparatus to perform further operations comprising:
classifying each source resource having a source score that does not exceed a source score threshold as an unqualified resource;

for each source-referenced resource for which at least one unqualified resource includes a link:
identifying a total number of source resources classified as unqualified resources that include a link to the source-referenced resource; and,
in a ranking process that ranks the source-referenced resource based, at least in part on the total number of source resources that include a link to the source-referenced resource, discounting the total number of source resources for the ranking process by the total number of source resources classified as unqualified resources that include a link to the source-referenced resource.

18. The system of claim 11, wherein the instructions upon such execution cause the data processing apparatus to perform further operations comprising:
for each source resource:
identifying anchor text for each link to another resource included in the source resource;
identifying a set of n-grams for each identified anchor text by breaking the anchor text for each link into n-grams; and,
assigning the source score for the source resource to each identified n-gram.

19. The system of claim 18, wherein the instructions upon such execution cause the data processing apparatus to perform further operations comprising determining an n-gram score for each n-gram based on source scores assigned to the n-gram for each source resource having a link that includes the n-gram in anchor text for the link.

20. A computer storage medium encoded with a computer program, the program comprising instructions that when executed by a data processing apparatus cause the data processing apparatus to perform operations comprising:
determining a seed score for each seed resource in a set of seed resources in accordance with a seed selection quality score,
the seed score for a seed resource being based on a total number of resources that each include a link to the seed resource and a total number of selections of the links to the seed resource, each selection counted in the total number of selections being a selection by a respective user causing a navigation to the seed resource, and
the seed selection quality score representing qualities of selections of the links to the seed resource;
identifying a set of source resources, each source resource in the set of source resources being a resource that includes a link to at least one of the seed resources;
for each source resource, determining a source score, the source score for the source resource being based on the seed score for each seed resource linked to by a link in the source resource;
identifying, for each source resource, source-referenced resources, each source-referenced resource being a resource linked to by a link in the source resource, and wherein the source-referenced resources include at least one resource that is not in the set of seed resources; and,
for each source-referenced resource, determining a resource score, the resource score for the source-referenced resource being based on the source score for each source resource that includes a link to the source-referenced resource.

21. The computer storage medium of claim 20, wherein the seed score for each seed resource is based on a ratio between the total number of selections of the links to the seed resource and the total number of resources that each include a link to the seed resource.

22. The computer storage medium of claim 20, wherein determining a seed score for each seed resource comprises:
   determining a selection quality score for each selection of a link to the seed resource, the selection quality score being a measure of quality of the selection of the link to the seed resource;
   determining the seed selection quality score based on the selection quality scores; and,
   determining the seed score for the seed resource based on the seed selection quality score, the total number of resources that each include a link to the seed resource, and the total number of selections of the links to the seed resource,
   wherein the selection quality scores determined for the selections of the links include at least two distinct values.

23. The computer storage medium of claim 20, wherein the instructions when executed by the data processing apparatus cause the data processing apparatus to perform further operations comprising adjusting a search result ranking of at least one of the source-referenced resources for a particular search query, the adjusting being based on the resource score for the at least one source-referenced resource.

24. The computer storage medium of claim 20, wherein the instructions when executed by the data processing apparatus cause the data processing apparatus to perform further operations comprising:
   classifying each source resource having a source score that does not exceed a source score threshold as an unqualified resource;
   for each source-referenced resource for which at least one unqualified resource includes a link:
      identifying a total number of source resources classified as unqualified resources that include a link to the source-referenced resource; and,
      in a ranking process that ranks the source-referenced resource based, at least in part on the total number of source resources that include a link to the source-referenced resource, discounting the total number of source resources for the ranking process by the total number of source resources classified as unqualified resources that include a link to the source-referenced resource.

* * * * *